United States Patent [19]

Kammel

[11] Patent Number: 5,121,601
[45] Date of Patent: Jun. 16, 1992

[54] DIESEL ENGINE EXHAUST OXIDIZER

[76] Inventor: Refaat A. Kammel, 7165 Clinton Rd., Jackson, Mich. 49201

[21] Appl. No.: 574,891

[22] Filed: Aug. 30, 1990

Related U.S. Application Data

[60] Division of Ser. No. 265,547, Nov. 1, 1988, Pat. No. 4,969,328, and a continuation-in-part of Ser. No. 921,330, Oct. 21, 1986, abandoned, and a continuation-in-part of Ser. No. 95,042, Sep. 9, 1987, abandoned.

[51] Int. Cl.$^5$ .............................................. F01N 3/02
[52] U.S. Cl. ....................................... 60/275; 60/286; 60/288
[58] Field of Search ........................... 60/274, 275, 288

[56] References Cited

U.S. PATENT DOCUMENTS

| | | | |
|---|---|---|---|
| 4,462,208 | 7/1984 | Hicks | 60/286 |
| 4,535,588 | 8/1985 | Sato | 60/288 |
| 4,566,271 | 1/1986 | French | 60/286 |
| 4,677,823 | 7/1987 | Hardy | 60/288 |
| 4,698,966 | 10/1987 | Distel | 60/286 |

Primary Examiner—Douglas Hart
Attorney, Agent, or Firm—Alex Rhodes

[57] ABSTRACT

An oxidizing device with a microprocessor control means for removing soot and other particulates from the exhaust gases of a diesel engine having an enclosure with a forward inlet for receiving diesel engine exhaust, a main flow path through the enclosure having a medium for trapping soot and other particulates, a bypass through the enclosure for diverting flow from the main flow path, heating elements embedded in the trapping medium, and a microprocessor control means for selectively regenerating the trapping medium in accordance with certain sensed conditions relating to the status of engine operation and the condition of a particulate trapping medium that is disposed in the main flow path. The main flow path has an electrostatic precipitator that is disposed in underlying relationship to the particulate trapping medium in the main flow path and a series of vanes are disposed in underlying relationship to the electrostatic precipitator and serve to redirect the exhaust flow passing through the main flow path and distribute the exhaust flow over the electrostatic precipitator and the trapping medium.

17 Claims, 8 Drawing Sheets

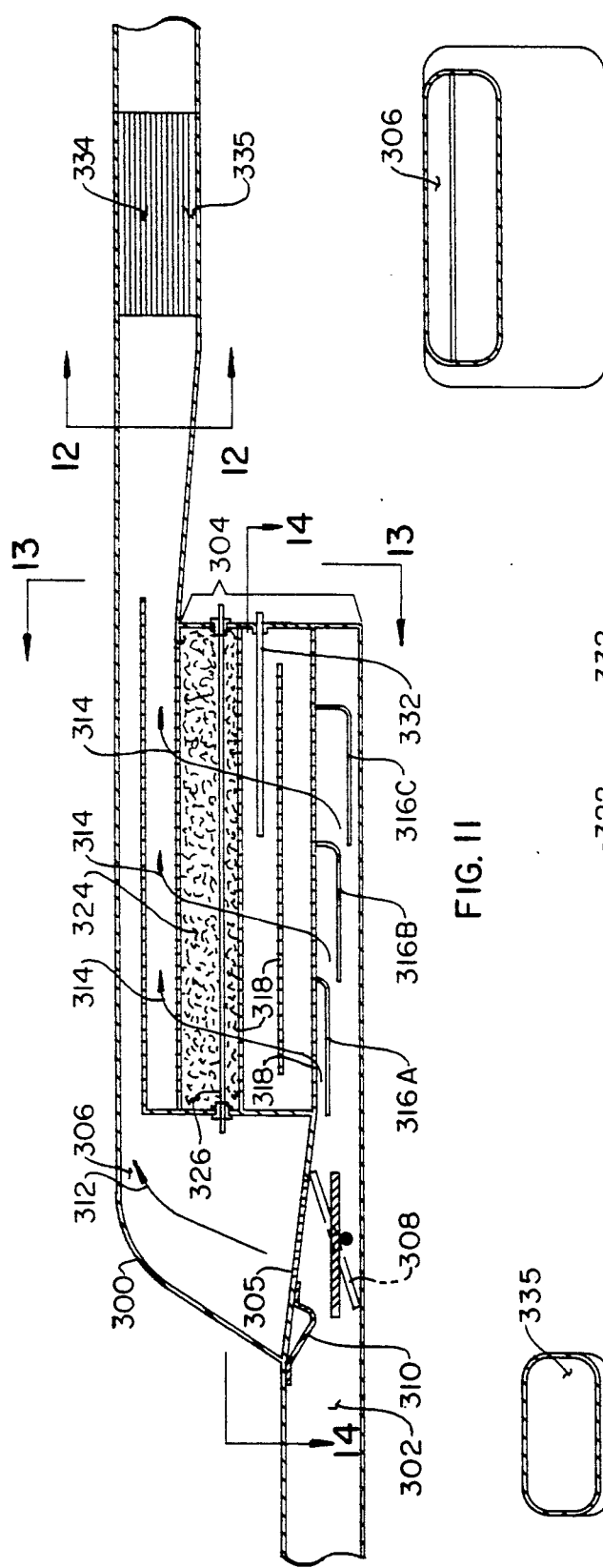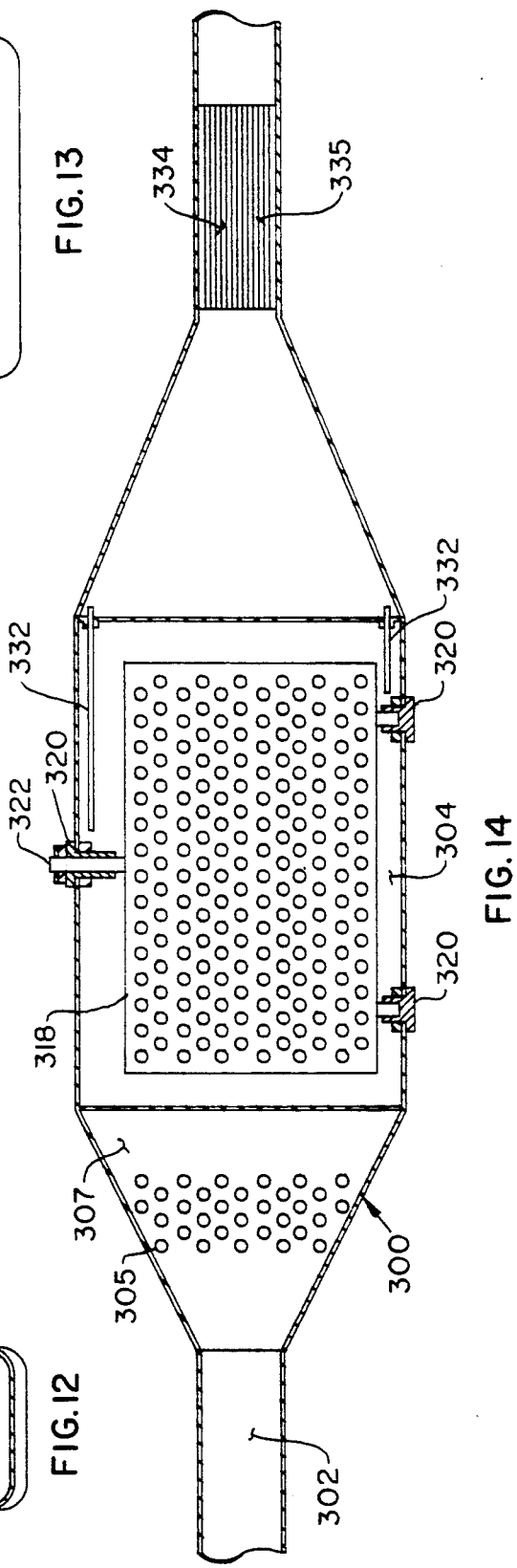

DIESEL ENGINE EXHAUST OXIDIZER

REFERENCE TO A RELATED APPLICATION

This application is a division of copending application Ser. No. 265,547, filed Nov. 1, 1988, now U.S. Pat. No. 4,969,328, granted Nov. 13, 1990; which was a continuation-in-part of my prior applications Ser. No. 921,330, filed Oct. 21, 1986 and now abandoned and Ser. No. 095,042, filed Sep. 9, 1987 and now abandoned.

BACKGROUND AND SUMMARY OF THE INVENTION

This invention relates to a device for oxidizing certain exhaust emissions from diesel engines, for vehicles or stationary applications.

It is well known that diesel engines emit noxious exhaust by-products which are not only a nuisance to the public, but a health hazard as well. Therefore, complete public acceptance of diesel engines will not occur until the noxious constituents of their exhausts have been substantially cleaned up. The U.S. E.P.A. has established, by regulations, levels for such emissions which are at present considered tolerable, but insofar as the applicant is aware, no one has been able to design a system which can meet them satisfactorily.

This invention relates to a device containing a filter means for connection to a diesel engine to process the exhaust. The device collects soot, and certain particulate emissions, and disposes of them during engine operation either (1) by what is herein called "natural regeneration" when the temperature of the filter is high enough, or else (2) by what is herein called "forced regeneration" when the filter, due to insufficiently high temperatures, becomes loaded with particulates to the point where it either may not function properly or else otherwise interfere with the vehicle's operation. The latter type of regeneration is initiated by an associated electronic control unit which receives signals from various sensing devices associated with the engine and/or with the collecting and oxidizing device itself. In both types of regeneration processes, soot which has been accumulated in the device is burned out and the by-product, carbon dioxide mainly, is disposed of into the atmosphere. The device may be endowed with particular catalyst formulation which also oxidizes hydrocarbons and carbon monoxide thereby substantially reducing, if not essentially entirely eliminating, diesel odor.

The invention comprises a number of features which individually and collectively contribute to its ability to clean up diesel engine exhaust. These features relate to: (1) the sensing of when the device has become loaded to the point where forced regeneration should be initiated; (2) the manner of by-passing the collection and oxidizing zone during forced regeneration; (3) control of the forced regeneration process; (4) the manner in which forced regeneration is performed; (5) the manner in which exhaust is forced to flow through the device; (6) the configuration of the filter; and (7) the overall organization of the device.

The foregoing features are disclosed in a first embodiment of the invention. Also disclosed herein is a second embodiment which contains further features beneficial to soot collection efficiency. They are: 1) a pre-converter for the control of hydrocarbon (HC), carbon monoxide (CO), and volatile portion of the particulates; and 2) an electrostatic augmented arrangement in which the particulates are pre-charged across a corona discharge medium ahead of the filter element.

The foregoing features, advantages, and benefits of the invention, along with additional ones, will be seen in the ensuing description and claims which should be considered in conjunction with the accompanying drawings. The drawings disclose a preferred embodiment of the invention according to the best mode presently contemplated in carrying out the invention.

BRIEF DESCRIPTION OF THE DRAWINGS

FIG. 11 is a central longitudinal cross sectional view through a second embodiment of device embodying principles of the present invention.

FIG. 12 is a transverse cross sectional view taken in the direction of arrows 12—12 in FIG. 11.

FIG. 13 is a transverse cross sectional view taken in the direction of arrows 13—13 in FIG. 11.

FIG. 14 is a cross sectional view taken generally in the direction of arrows 14—14 in FIG. 11.

DESCRIPTION OF THE PREFERRED EMBODIMENT

I. General System Description

Figure 1:
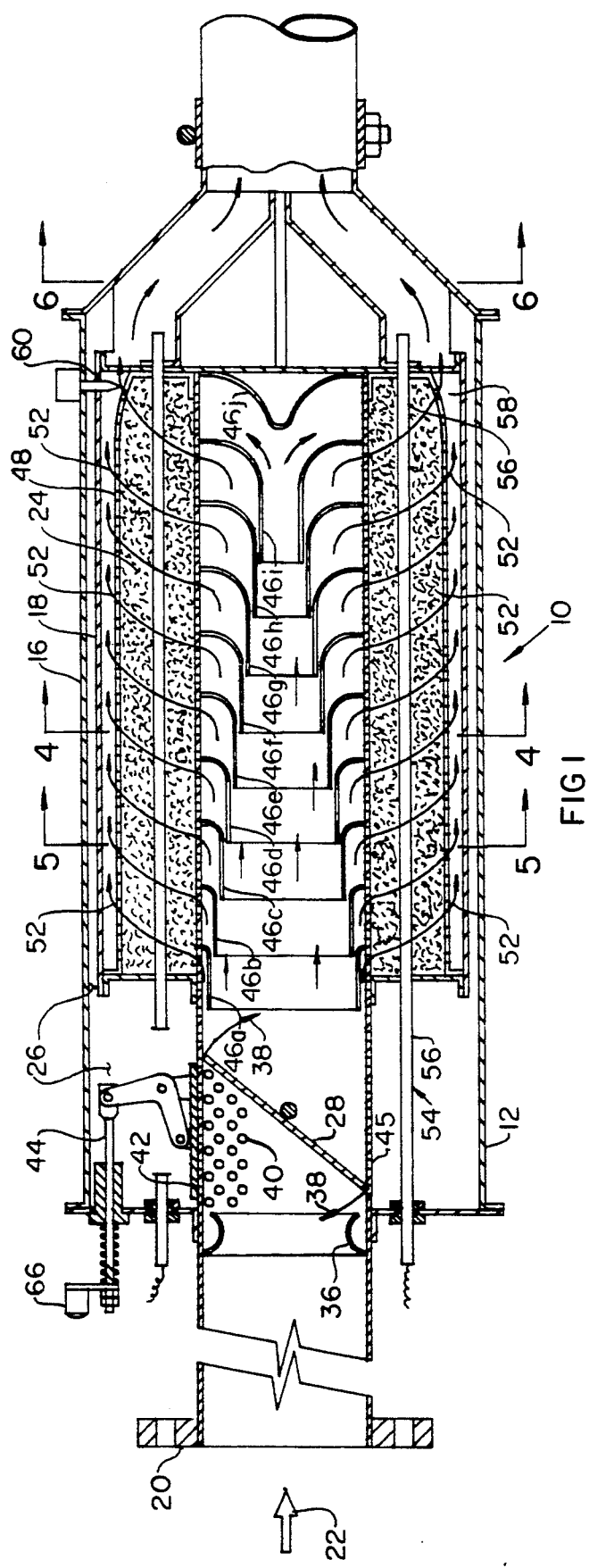
FIG. 1 is a central longitudinal cross sectional view through a device embodying principles of the invention.
Figure 6:
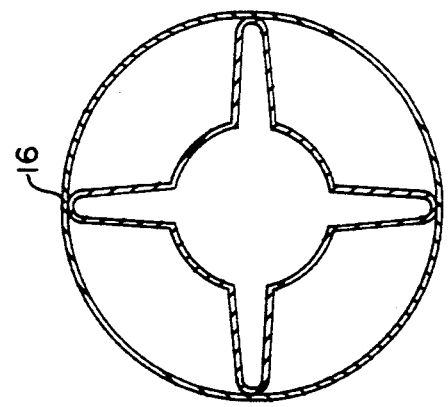
FIG. 6 is a partial transverse view through FIG. 1 on line 6—6.
Figure 4:
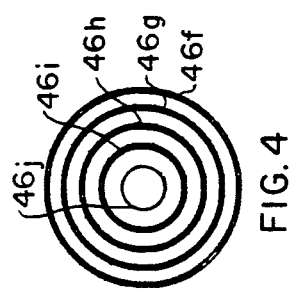
FIG. 4 is a partial transverse view through FIG. 1 on line 4—4.
Figure 5:
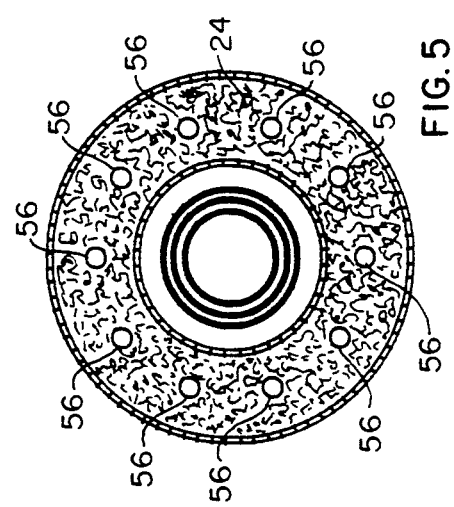
FIG. 5 is a partial transverse view through FIG. 1 on line 5—5.
Figure 2:
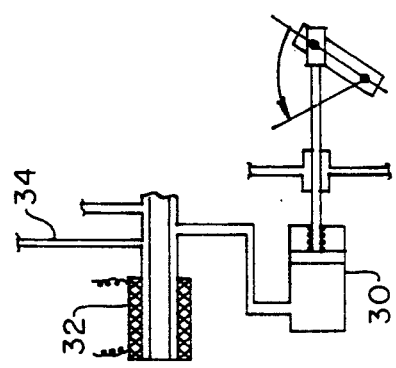
FIG. 2 is a fragmentary view showing additional detail.

The overall system 10 comprises an oxidizer unit 12, an electronic control unit 14, and various sensors to pick up input functions such as temperature, engine RPM, injection pump rack position, and back pressure.

A. Oxidizer Unit 12

The oxidizer unit 12 comprises outer and inner concentric shells 16, 18 made of stainless steel and carbon steel construction to resist the harsh and high temperature environment. It has an inlet 20 which connects to the engine exhaust manifold outlet. The exhaust flow (arrow 22) is directed either to a catalyst unit 24 within shell 16 or to a by-pass 26 which forms an annular space between the shells 16, 18.

A butterfly valve 28 is at the entrance to the two flow paths through the unit. The butterfly valve is operated through a vacuum actuator 30 which, in turn, is operated by an electric solenoid switch 32 which controls the vacuum signal 34 according to an electric output control signal received from electronic control unit 14. When the butterfly is in the position shown, flow is through the by-pass; when in the position of the arrows 38, flow is through the catalyst unit 24.

A venturi 36 is installed ahead of the butterfly and by-pass entrance, thus creating a slightly lower pressure at the by-pass entrance when the butterfly valve is in the open position.

The by-pass entrance 40 is normally closed by a spring-biased door 42; the door and mechanism 44 are so designed in relation to the venturi's effect that when the butterfly is open to the filter unit 24, as illustrated, the pressure force on the by-pass door will be maintained almost constant under different engine RPMs and loads. The by-pass door will tend to lift open only when the back pressure due to soot build-up within the unit 24 increases to a threshold point.

The core of the unit is made of a series of guiding vanes 46a through 46j specially designed to provide a uniform distribution of the flow over the surrounding catalyst 48. The series of vanes provides change in flow direction and redistribution which results in lowering flow velocities substantially at the filter thus increasing the particulate collection efficiency of the catalyst. The filter 24 is in the form of an annular block made of super-imposed layers of stainless steel wire mesh as supporting material and stainless steel felt of fine strands. This combination provides adequate support while maintaining the efficiency of collection high. The two superimposed layers are rolled up to form the annular block. The flow direction through the catalyst unit is indicated by arrows 52.

Embedded in the catalyst is a heating unit 54 made of parallel elements 56. The heating unit is used as an igniter to initiate forced regeneration of the unit. In a way it functons similar to a match so that the electric heat input required to initiate and maintain regeneration is low and within the practical load demand of the electrical system of a diesel engine vehicle.

Installed at the outlet end of the annular space 58 surrounding the catalyst block 48 is a thermocouple 60 that is used to monitor the temperature and feed it to electronic control unit 14.

B. Electronic Control Unit (ECU) 14

Figure 3:
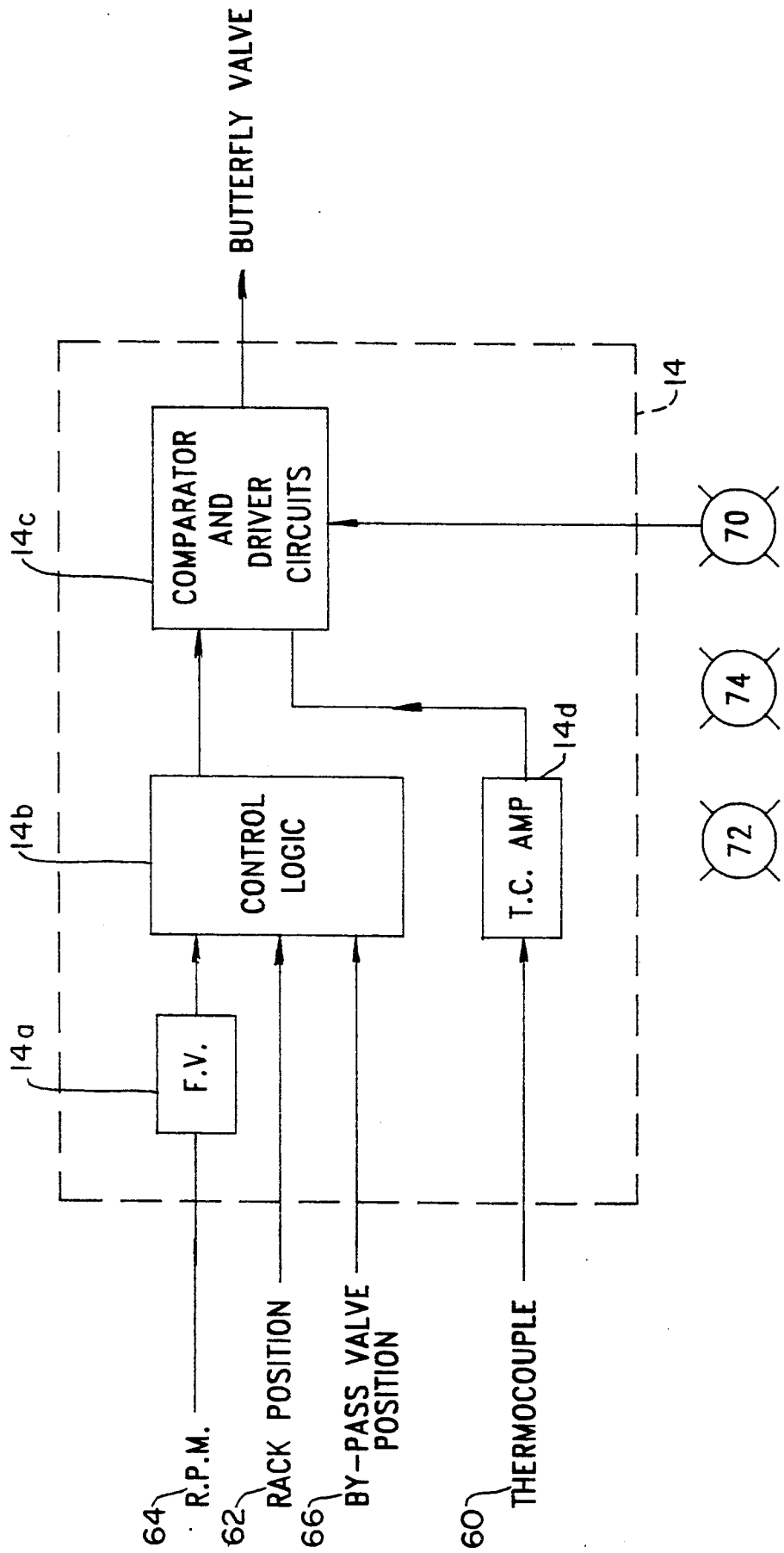
FIG. 3 is a block diagram of the associated electronic control.

The electronic control unit is made of various dedicated circuit boards and logic elements. FIG. 3 illustrates the schematic of the unit.

C. Sensors

1. Injection pump rack position sensor 62

A standard magnetic pick-up 62 is used to transform the rack position (representing engine load) to one electric signal for electronic control unit 14.

2. Engine RPM sensor 64

A standard magnetic pick-up is used to transform engine RPM to another electric signal for electronic control unit 14.

3. Back-pressure switch 66

The mechanism 44 associated with by-pass door 42, in turn, operates a photo-electric switch 66. This switch 66 transmits a signal to electronic control unit 14 indicating a loaded trap.

4. Detail of ECU 14

ECU 14 comprises a frequency-to-voltage converter 14a which converts the rpm pulses from sensor 64 into a corresponding voltage. This voltage, along with the rack position voltage from sensor 62, and the by-pass valve position voltage from photo-electric sensor 66, are inputs to a control logic circuit 14b. The control logic is constructed to perform the logical control functions herein described for commanding regeneration under the specified conditions. The control logic 14b has its output connected to comparator and driver circuits 14c which drive the butterfly valve in the manner described herein. There is also an amplifier 14d for amplifying the thermocouple signal and supplying it through circuits 14c for control in the manner described.

II. OPERATION OF SYSTEM

Under normal mode of operation no signal is forwarded to solenoid switch 32 of the vacuum actuator, and butterfly valve 28 is in the normal open position illustrated. The entire flow is directed toward the catalyst where soot trapping takes place in addition to chemical reduction of HC and CO emission dependent on any catalyst which may be used on the filter.

After few hours of operation soot accumulation reaches a point where regeneration must take place to bring the trap back to original condition. Loading of the filter with soot is usually accompanied with increase in back pressure and consequently performance and fuel losses. Unless exhaust temperature under some mode of operation reaches soot ignition temperature and consequently the oxidizer regenerates in a natural mode, a forced regeneration is initiated by the electronic control unit. This is the case always when the filter block is not catalyzed since soot ignition temperature is always higher than exhaust temperature.

A. Forced Regeneration Mode

1. Forced regeneration is requested when back pressure continues to build up until threshhold value is reached, causing by-pass door 42 to be popped open, and the photo-electric switch 66 sends a signal to the ECU for the need for regeneration.

2. Regeneration will not actually start until favorable engine RPM, temperature, and load condition are reached. Usually, this requires exhaust temperature sensed by thermocouple 60 to be above a certain temperature, to reduce heater demand on the electric heating unit 54, engine RPM below a certain value, to reduce throttling effect through the by-pass, and engine load rack position below a certain value, to ensure adequate supply of oxygen. If some of these conditions are not satisfied during a certain time, such as the first ½ hour, after a regeneration request has been initiated, regeneration will start anyway. The driver of the vehicle has the option to start regeneration by pushing a switch 70 after an indicator light 72 showing a regeneration request has been turned on.

3. When forced regeneration starts, a second light 74 is lit and the following steps take place:

(a) Butterfly valve 28 closes, and electric heater power is turned on for a specified period of time.

(b) At the end of the above cycle, the power is cut off to the electric heater, and the butterfly valve will start duty cycling on and off every certain number of seconds. The amount of valve closing time is a function of the temperature at the thermocouple. Longer closing time results in lowering temperature due to oxygen starvation. A small leakage in the butterfly valve is created to minimize smoldering of soot and keep slow combustion during prolonged valve closing. The valve opening time is such that the entire volume within catalyst is swept with fresh supply of exhaust (oxygen). This results in increasing the temperature at the catalyst. The duration of valve opening time is modulated by engine RPM. Duty cycling of the butterfly valve is controlled by the signal from the thermocouple, through closed loop operation, and temperature is controlled at desirable level to ensure optimum regeneration thus achieving complete combustion and burnout of all soot accumulated. Also vital in the process is limiting the maximum temperature to certain valve to avoid burnout and destruction of the catalyst which is a universal problem with existing traps today.

(c) The process is terminated when the exhaust temperature continues to drop until a certain value is reached and valve opening frequency increases to a certain level indicating regeneration has been achieved. At this point in time, the ECU terminates the process and the butterfly valve will return to the normal open position.

B. Natural Regeneration Mode

Natural regeneration, sometimes may be referred to as "continuous regeneration", is encountered when exhaust temperature is higher than soot ignition temperature. This may be either a condition that results in continuous normal operation without undue effect on the filter, or depending on trap load, it may result in the generation of excessive heat and temperature which could be destructive to the filter. This condition could arise in cold weather during start up due to high HC and CO emission followed by highway driving or due to engine problems whereby oil consumption is too high.

Thermocouple 60 will sense the exhaust temperature and if the temperature or rate of temperature rise with respect to time exceeds the set limits, the butterfly valve will duty cycle in an on-off mode similar to the foregoing A-3 mode of operation. Through closed loop operation, the temperature at the catalyst is controlled and a limit on the maximum temperture is achieved. The process is terminated in a manner similar to the forced regeneration mode.

III. FEATURES

A. System Design

The overall system design, which is a new breakthrough in the technology of controlling diesel emission by exhaust after-treatment technique, will ensure that problems relating to filter burnout, fire hazards, catalyst durability and useful life are resolved satisfactorily in a manner acceptable to different applications of diesel engines in vehicles or stationary applications. The double wall design will limit fire hazards to a minimum since high-temperatures during regeneration is contained within the inner wall. All these features are contained in a compact design which is suitable for installation in the engine compartment or under the floor in a vehicle.

B. Venturi, by-pass passive feature

The venturi by-pass design provides a passive concept for by-passing the flow. In case of butterfly valve, control unit, or loaded trap malfunction, the by-pass feature will ensure that a flow area exists all the time for the exhaust gases, and this unique design feature will ensure that any malfunction in the active components of the oxidizer system will not interfere with the continuous operation of the vehicle. The applicant acknowledges a drop in performance and some power loss when this condition arises which is desirable to have repaired.

C. Venturi, by-pass as trap loading pickup

The venturi is designed to create a negative pressure at the by-pass opening that is a function of flow speed. The pressure drop across the reactor (clean) creates a positive pressure at the by-pass door. The venturi is designed so that the positive and negative pressure drops compensate each other at all different speeds. The door at the by-pass opening, therefore, will not open until the reactor is loaded with particulate and thus an increase in the positive pressure, which is proportional to the degree of trap loading, will offset the spring load on the door causing the door to open. Through the linkage mechanism, the motion is carried to the electrical switch 66 giving signal to the ECU that the trap is loaded and needs regeneration. This arrangement provides a positive, yet passive, feature of predicting trap loading when compared with human use of pressure transducers and associated problems resulting from soot and moisture accumulation at dead spaces.

D. Regeneration Conrolled Temperature Through ECU

Regeneration controlled temperature through ECU and associated sensors and actuators will result in what can be labeled an ideal regeneration through a well controlled process that has a minimum effect on emission during regeneration. The ECU will ensure that a design temperature is achieved and maintained constant during regeneration thus resulting in clean combusion of soots and reliable regeneration.

E. Embedded Electric Heater

Embedded electric heater within the catalyst, and the use of stainless steel felt will result in soot accumulation all around the electric element and felt nearby. In initiating a forced regeneration, the heat energy required to initiate and maintain a regeneration is a small fraction of heat required by conventional systems in which heat is applied ahead of the catalyst. This is in addition to lowering the heat-up time required to initiate soot ignition due to use of bare wire without sheathing around, thus reducing the thermal inertial effect of the wire (heating time for the wire is reduced to about 15 seconds). In addition, the use of elements without sheathing results in lowering thermal inertia and the time required for the element to reach ignition temperature (typically 15 seconds). The problem of maintaining low thermal inertial and providing electric resistance between the element and the steel felt is achieved by applying thin layer (0.005") of ceramic coating having major constituency of silicon oxide and binding phases of silicates and phosphates. The location of the heating element is such that maximum advantage of predominant modes of heat transfer (convection, radiation) are utilized to the maximum to achieve soot ignition temperature all over the catalyst in the shortest period of time.

F. Guide Vanes

The design of the vanes which is unique in this oxidizer will provide the following advantages: (1) minimum pressure drop, (2) equal flow distribution all over the catalyst, which in turn leads to (3) radial flow through the catalyst with a linear velocity through the catalyst that is a fraction of the linear velocity at the inlet of the oxidizer (a ratio of 1:15 to 1:20). This is in comparison to known designs such as axial flow or radial flow. A lower velocity in the catalyst has the following advantages: (1) high filtration efficiency, (2) low Reynold's Number and low pressure drop, (3) minimum or low blowoff of particulate from the catalyst. This unique feature is achieved in the minimum packaging volume which is almost a must in most applications either in the engine compartment or under the floor.

F. 1. Calculation of Vane Sections

The vane's function is to segment, divert, and change flow direction from axial to radial. The entire cross section of the flow in the axial direction is segmented into ten concentric segments for the ten vane example shown. Each concentric segment has an axial area equal to one-tenth the total axial flow area as shown in the diagram. Consequently, for a diameter D of the inlet 45, diameter D1 for 46a, D2 for 46b, D3 for 46c, D4 for 46d, D5 for 46e, D6 for 46f, D7 for 46g, D8 for 46h, and D9 for 46i, the following relationships exist:

$$D1 = \sqrt{0.9}\ D, \quad D2 = \sqrt{0.8}\ D, \quad D3 = \sqrt{0.7}\ D,$$
$$D4 = \sqrt{0.6}\ D, \quad D5 = \sqrt{0.5}\ D, \quad D6 = \sqrt{0.4}\ D,$$
$$D7 = \sqrt{0.3}\ D, \quad D8 = \sqrt{0.2}\ D, \quad D9 = \sqrt{0.1}\ D$$

The use of ten concentric segments is intended as an example. The actual number used in any given device will depend on certain factors, the most significant of which is probably the size of the device. A smaller design could have fewer, such as five, or a larger design, more than ten.

G. Sandwiched Catalyst Design

This feature is intended to combine the advantage of wire mesh as structurally stable and supportive material, but is slightly inferior as to collection efficiency and blowoff, and stainless steel felt which has high filtration efficiency and minimum blowoff, but unfortunately also has the possibility of plugging and is structurally unstable. By sandwiching the felt between the wire mesh, it is possible to achieve high filtration. Also, when the felt is loaded with particulate, the wire mesh behind it provides a collection room for soot dendrite that would break off the felt without causing plugging of the trap.

DESCRIPTION OF FIGS. 7-10 EMBODIMENT

FIGS. 7-10 show a further embodiment of the invention designated by the general reference 200. It shares many common features with the FIG. 1 embodiment, and they are identified by like reference numerals. The two major features of embodiment 200 which are not present in the FIG. 1 embodiment are generally described as a pre-converter and an electrostatic augumented converter.

Pre-converter

Particulate emissions generated from diesel engines are broadly divided into two portions: 1) solid carbon molecules; and 2) volatile portions containing hydrocarbon elements. Diesel particulates are defined as the disperse matter collected on a filter at a temperature below 52 degrees C. (Ref.: 40 CFR, Part 86, Sub. B). Hydrocarbons having a dew point above 52 degrees C. will condense when cooled to 52 degrees C. or below. Particulates serve as condensation nuclei and the resultant particulates have significant soluble organic fraction (SOF). SOF condensed may account for 10 to 50% of total hydrocarbons, and constitutes between 1 and 90% of the total particulate materials, dependent on engine type and use of turbocharging.

The device of the present invention contains a trap converter and operates at a temperature that is much higher than 52 degrees C. because it is located in the exhaust system. As such it exhibits rather very little catalytic activity at most. This is due to the non-use of noble metals in the majority of cases and to the build-up of particulates on the surface of the wire mesh which isolates the alumina-coated mesh from the gas stream. The net result is that the device (converter) will be functioning in a mode that is being defined as a "total trap" for solid particulates at the operating temperature of the trap. The volatile portion of the particulates, in gaseous form, will pass through the trap without any entrapment. The converter works in a mode as close to a "pure trap" for solid particulates.

Applications where the SOF is dominant or where higher filtration is needed will require a pre-converter to work essentially on the gaseous portions of HC, CO, and SOF. A pre-converter functions essentially in a manner similar to a catalytic converter on a gasoline engine, but with some differences.

A pre-converter in a diesel exhaust environment must be designed in such a way as to maintain a clean surface with minimum build-up or entrapment of particulates on the surface, while maintaining a good gaseous conversion efficiency. This requirement is essential since build-up of soot particulates on the surface of a catalyst could lead to burn-out of the accumulated soot under certain driving conditions (high temperature followed by oxygen rich exhaust) leading to possible destruction of the catalyst and/or burn-out of the pre-converter.

A pre-converter for a diesel control system is designed on the basis of flow velocity. Above a certain threshhold of flow velocity, particulates that have collected on the pre-converter are blown out and re-entrained in the exhaust flow for capturing in the converter. In a vehicle, the device is designed to have this threshhold velocity occur at low to moderate speeds, for example 25-30 miles per hour.

Figure 7:
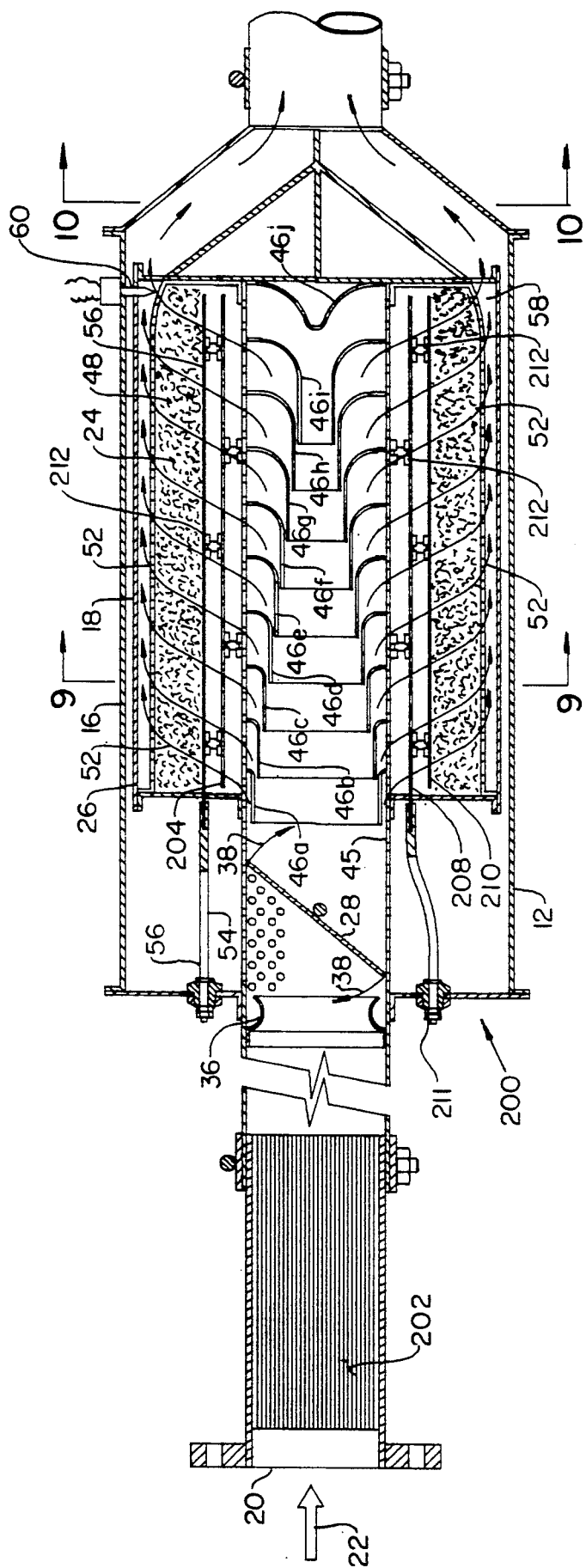
FIG. 7 is a view similar to FIG. 1 but of a further embodiment containing additional features.

A diesel engine emission control system comprising a pre-converter and a converter is capable of achieving high filtration efficiency for a broad number of diesel engine applications. The converter traps particulates while the pre-converter oxidizes gaseous and SOF pollutants. In FIG. 7 the pre-converter is designated 202, and is disposed upstream of the converter. For certain engines dependent on exhaust temperature profile, it may be preferable to place the pre-converter downstream of the converter where it functions as a post-converter.

Electrostatic Augmented Converter

Conventional fibrous filters such as used in the converter often are limited in performance and collection efficiency depending on the nature of particulates in the diesel exhaust.

An electrostatic augmented filter as shown in FIGS. 7-10 has considerable improvement in performance, particularly higher collection efficiency (especially for dry particulates normally generated from turbocharged diesels), and lower pressure drop across the fiber medium.

FIGS. 7-10 show an electrostatic precipitator 204 as an integral part of the converter. It consists of three coaxial perforated screens 206, 208, 210, of successively larger diameter surrounding the vanes. The inner screen is electrically grounded and joins to the perimeters of the vanes. The intermediate screen 208 is electrically insulated from the rest of the converter and is connected to a high voltage terminal 211 which in turn is connected to a high voltage D.C. power supply (not shown). Screen 208 is electrically charged from the power supply and when so charged, serves to precharge the radial flow of exhaust gases which pass through its perforations. The high voltage is such that a corona discharge takes place between the screen 208 and the inside surface of the screen 210. Although the screen 208 comprises perforations in the form of circular holes formed by punching material out of the screen, other forms of perforations may be used to advantage. For example, perforations formed by piercing rather than punching create elongated, cylindrical-walled perforations which have free edges toward screen 210 at which the corona discharge occurs. This can result in full ionization of the particulate matter.

The screens 206, 208, 210 are maintained in spaced apart relation by a series of high-voltage insulators 212 at appropriate locations. Since particulates are electrically conductive, insulators are subject to mechanical failure caused by electrical sparking generated from disposition of conductive particulates on the surface. Arc-over results in localized overheating and the associated thermal stress leading to mechanical failures. Another mode of failure which results from arc-over is not necessarily accompanied by stress-induced mechanical failure. Rather, particle deposits may impregnate the insulator at the high temperatures induced by arcing and ultimately lead to permanent short-circuiting of the insulator.

Figure 8:
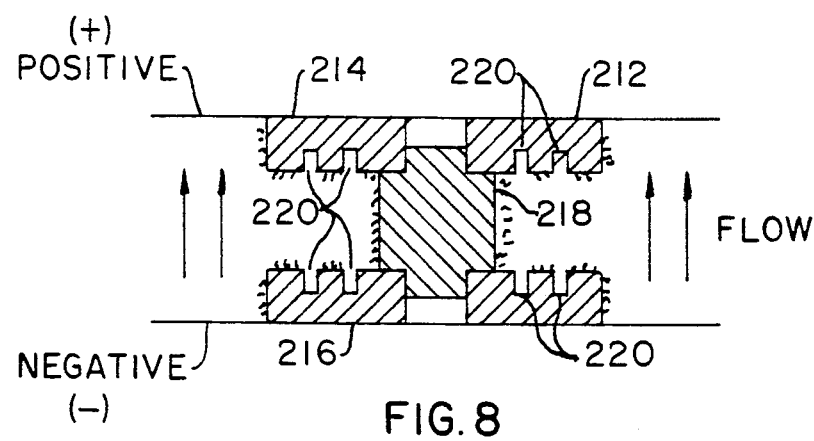
FIG. 8 is an enlarged axial cross section of an element of FIG. 7 by itself.
Figure 9:
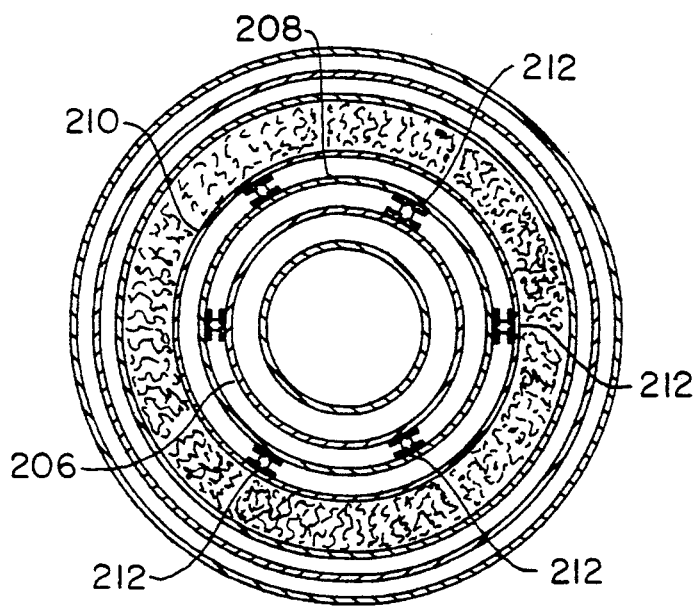
FIG. 9 is a transverse cross section on lines 9—9 in FIG. 7.
Figure 10:
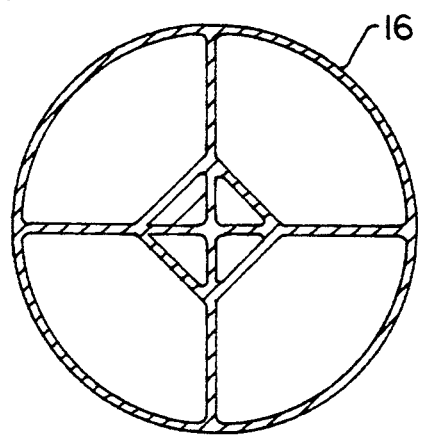
FIG. 10 is a transverse cross section on lines 10—10 in FIG. 7.

The design of insulators in the device 200 is intended to yield improvements in performance and life expectancy. Details of an insulator are seen in FIG. 8. Basically the insulator, which is of course of a suitable material, comprises a pair of disc-like heads 214, 216, which are at the opposite ends of a cylindrical spacer 218. The insides of the heads comprise concentric circular grooves 220 which constitute air gaps forming stagnant spaces. The intention is to control the path of arcing such that arcing occurs mostly through the air, and in this way the resultant heat is dissipated mostly in the air rather than on the insulator. The surface of the insulator is preferably glazed to minimize surface adhesion of particulates.

The surface area of the insulator along which flow takes place is where soot tends to collect. The inclusion of the air gaps and stagnant spaces breaks down the surface area such that soot collection is minimized, especially in the stagnant spaces. Soot accumulation in the stagnant spaces is very small in comparison to the surfaces more directly exposed to the flow. When arcing occurs, virtually all accumulated soot is cleared at and around the location where arcing occurs. At the air gaps the soot is completely cleared. The arcing also results in substantial clearing of soot at other nearby locations on the insulator. Because the air gaps and stagnant spaces accumulate soot at much slower rates than if the insulators did not possess such features, and because they increase the length of the electrical path, arcing frequency is drastically reduced, and life expectancy is increased.

FIGS. 11-14 show a further embodiment of converter, or diesel emission oxidizer, 300 which has a flatter profile than the preceding embodiments. A flatter profile may be an advantage in certain applications, such as when the converter is mounted horizontally under the floor of the body of a truck or car. The exhaust flow from a diesel engine enters the inlet 302. The exhaust flow is directed either to an electrostatic precipitator/catalyst section 304 or to a bypass 306. A butterfly valve 308 is at the entrance to the two flow paths through the converter. When the butterfly is in the solid line position, flow is to the section 304, but when the butterfly is in the broken line position, flow to section 304 is blocked. When the flow to section 304 is blocked by the butterfly, the entire flow passes through the bypass 306, entering the bypass at the perforations 305 in wall 307. A venturi section 310 is disposed just ahead of the butterfly.

The butterfly is opened and closed by a control (not shown in FIGS. 11-14) which is the same as the control described for the first embodiment. The embodiment of FIGS. 11-14 has no separate bypass door such as the door 42 in FIG. 1. When the butterfly is in the solid line position, the venturi effect creates an acceleration in the flow which will result in the flow passing to the section 304, and not to the bypass. When the butterfly is in the solid line position, flow through the precipitator/catalyst is indicated by the arrows 314. When butterfly 308 is in the broken line position, bypass flow through the converter is indicated by the reference numeral 312.

The precipitator/catalyst section 304 comprises a series of guide vanes 316A, 316B, 316C that are arranged at the bottom to provide a generally uniform upward distribution of the flow through the precipitator/catalyst 304 in the manner indicated by the arrows 314. The vanes provide a change in flow direction and a distribution which results in lowering the flow velocities, thereby increasing the particulate collection efficiency of the catalyst.

The particular number of vanes that are employed will depend upon the specific design and the three vanes shown in the drawing is an arbitrary number. The width, or lateral dimension, of the vanes is substantially equal to the width of the converter's enclosure.

The electrostatic precipitator portion of precipitator/catalyst 304 overlies the vanes and comprises three generally rectangular shaped plates 318 which are spaced apart from each other in a generally parallel manner. The middle plate 318 is supported from the enclosure by means of insulators 320. At least one of the insulators however is constructed with provision to provide for an electrical connection to the middle plate via an electrical terminal such as the terminal 322 indicated in FIG. 14. The other two plates are joined to the enclosure and are therefore grounded. All plates 318 contain perforations to provide for flow through the electrostatic precipitator portion. It is the middle one of the three plates 318 that is connected via terminal 322 to a high voltage DC power supply (not shown), and the electrostatic precipitator operates to precharge the flow of exhaust gasses in the same manner as described in connection with the electrostatic precipitator of FIGS. 7-10.

The catalyst portion of precipitator/catalyst 304 comprises a stainless steel wire mesh 324. One or more ceramic coated electric heating elements 326 passes through and is embedded in the wire mesh 324. A ceramic coating on the electric heating elements 326 provides for, among other functions, electrical insulation between the heating elements and the wire mesh when the heating elements are energized. The application of alumina washcoat to the mesh forms the mesh into a rigid matrix, similar to a cobweb, which has a significant void volume that may be approximately 90%. As a result, contact points between the electric heating elements and the rigidly formed wire mesh are fixed in place for life.

However, as a result of the heating elements' expansion and contraction, and associated raspe effect-friction, gas pulsation, vibration, aging, etc,-, some of the contact points between the mesh and the heating elements may loose their ceramic coatings during the life of the device. This could in turn result in an electrical short circuiting at any such point which would bypass the rest of the heating element as well as resulting in accelerated failure of the heated portion.

Tests that have been performed have shown that if a proper size is selected for the wire mesh that comes in contact with the heating elements, the short circuit problem is self-correcting. Most of the heating currents are on the order of 50 to 80 amps. Stainless wires having hydraulic diameters in the range of 0.15 to 0.25 mm will burn out in 3 to 10 seconds should a short circuit develop, thereafter rendering the short circuit open. Accordingly, in the event of certain ceramic degradation, the provision of wire mesh strands that are below a certain size will ensure self-correction of short circuiting. Since short circuiting will be a rather localized phenomenon wherever it occurs, a relatively minor ceramic degradation will not have any appreciable effect on the performance of the device.

Converter 300 also comprises a dual purpose air injection system. Air injection is a known procedure that has been used in particulate traps for regeneration. It provides adequate oxygen supply that enhances the probability of a successful regeneration. Air injection is also a known procedure that has been used in blowing off aerosol particles accumulating around insulators in electrostatic precipitators, and as such it prevents sparking and mechanical failure of the insulators.

Converter 300 is designed to regenerate under most driving conditions except those associated with high acceleration, load and speed. In most automotive applications sudden change in driving patterns can increase the probability of incomplete regeneration. Although an incomplete regeneration is detected and accounted for and has no impact on operability or emission, the probability of incomplete regenerations may warrant the use of air injection.

Accordingly, in converter 300 injected air from a suitable air supply, such as a pump (not shown) for example, is introduced into section 304. Within converter 300, tubes 332 convey the injected air to the individual insulators. This injected air is used in conjunction with the exhaust flow for the combustion of soot during regeneration and also for maintaining the insulators in a reasonably clean condition.

A further aspect of the invention relates to the reduction of peak temperatures leaving the outlet of the converter during regeneration. The regeneration process is controlled through duty cycling of the butterfly valve in the manner described for FIG. 1. This results in the repeated diverting of the exhaust flow into two segments, namely a flow segment that has passed through precipitator/catalyst 304 followed by a flow segment that has passed through the bypass. Each of these two segments typically has a duration of approximately one to three seconds. Since these segments discharge at the downstream outlet end of the converter, it is possible for segments of high temperature gases to escape from the tailpipe at temperatures close to the regeneration temperature. Such high temperatures, which could reach 1400 degrees F., may pose a fire/safety hazard around the vehicle, particularly at low traffic speeds or in congested areas. This problem is likely to be encountered on some applications where the converter is installed away from the engine and the tailpipe section that is downstream from the converter is short.

This problem can be resolved in a practical fashion by installing a thermal stabilizer downstream from the converter in the outlet 335. FIGS. 11 and 14 show such a thermal stabilizer 334 disposed in the outlet section of the converter. The stabilizer is an insert similar in construction to a preconverter but without catalysts. The insert has a sufficient surface area to enhance thermal conductivity between the hot gases and the insert itself, and it should also have sufficient thermal inertia (weight) to absorb the required amount of heat from a hot gas segment, or column, as that hot gas segment passes through the thermal stabilizer. The heat that is absorbed by the thermal stabilizer is exchanged back to the bypass flow segment, or column, when the cooler bypass flow segment passes through. This process of extracting heat from the flow that has passed through the precipitator/catalyst and then rejecting heat to flow that has passed through the bypass occurs during each cycle of butterfly valve operation. In this way, the thermal stabilizer reduces the peak exhaust gas temperatures at the tailpipe during regeneration. Where the precipitator/catalyst flow gases may be as much as 1400 degrees F. and the bypass flow gases in the range of 300 to 600 degrees F., the thermal stabilizer can reduce the maximum tailpipe temperature to an acceptable level.

While it is expected that a converter system will require maintenance at certain maintenance intervals, the system will not regenerate if it is not maintained and a malfunction develops in any of the active components except for the butterfly valve. Converter 300 is designed such that the pressure drop through a completely soot-laden wire mesh is lower than the pressure drop required to force the exhaust flow through the bypass. If the system is not able to regenerate, it automatically defaults to an agglorometer mode of operation so long as the spring-loaded butterfly valve 308 assumes the solid line (open) position. In this mode of operation, all soot coming into the wire mesh is collected and then subsequently blown off in the form of coarse denderites. Accordingly, the problems associated with particulate emissions entrained in exhaust gases, namely, air pollution, are kept under control; however, the soiling from denderites will remain since these denderites will pass out of the tailpipe and fall on the ground. It is believed that the emission of dendrites is preferable to exhaust-entrained particulates and therefore, the automatic shifting to an agglomerator mode of operation in the event of a failure of any of the active components is deemed desirable.

One of the ways to signal trap loading is to utilize differential pressure transducers before and after the converter and to develop a signal when a predetermined amount of trap loading is sensed. This signal is used to initiate regeneration. Since the transducers are exposed to soot and moisture accumulation, the transducers may malfunction. Moreover, the use of transducers adds to the overall converter cost.

An aspect of the converter that is disclosed herein relates to a method for predicting soot emission based on engine soot mapping data developed from actual test data from actual engines. Consequently the use of pressure transducers to sense trap loading can be eliminated. For a given engine, the amount of soot generated over time by the engine may be approximated by integrating engine RPM (speed) and rack position (load) with respect to time and then comparing this result with known soot mapping data for the particular model of engine. The process may even be refined by incorporating a correction factor which is equivalent to an emission deterioration factor to account for the increase in emission with accumulated mileage. The engine RPM and rack position are sensed by electronic sensors already on the engine. A microcomputer is utilized to perform the integration functions and the comparison with engine soot mapping data.

It is to be appreciated that this method may not precisely predict the actual soot accumulation and hence, it may not be suitable for certain types of traps such as ceramic traps, since the margin of error is beyond the allowable regeneration zone.

Figure 17:
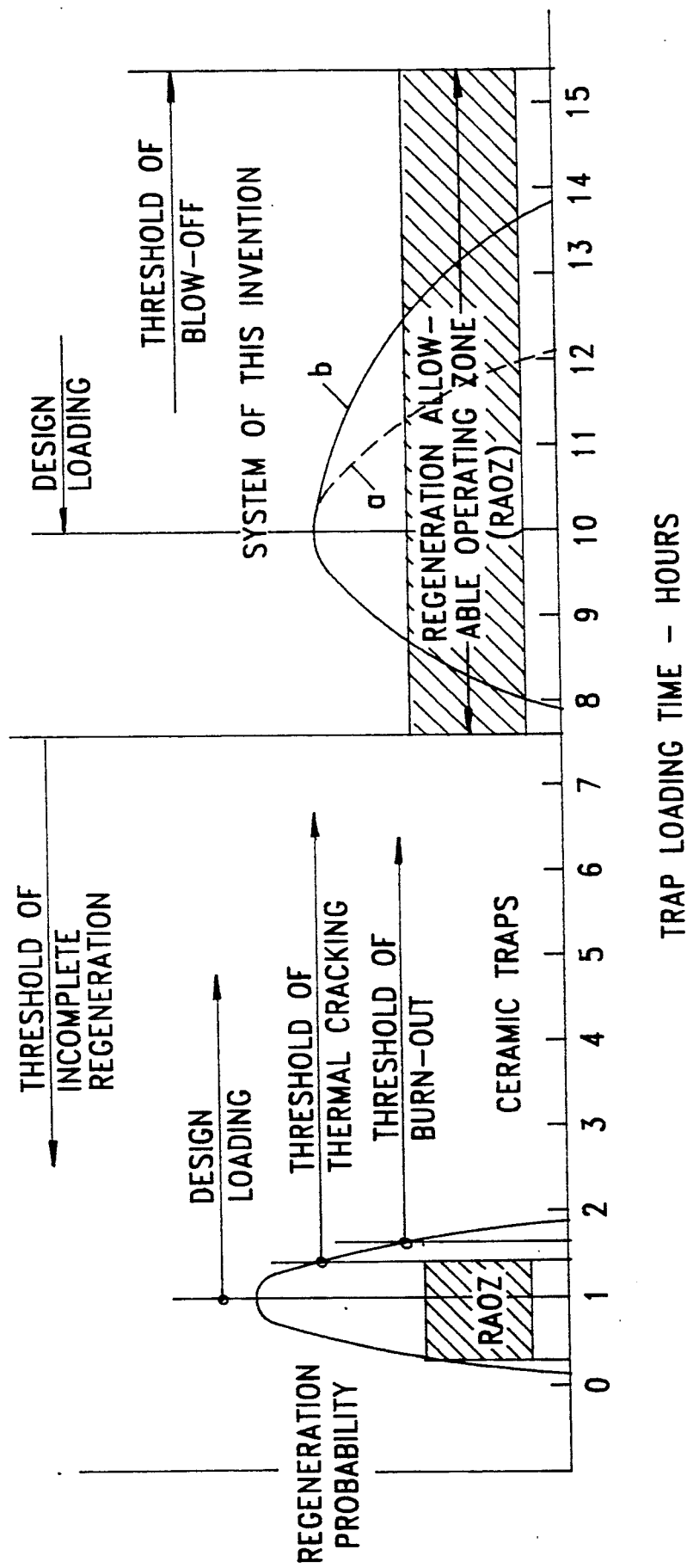
FIG. 17 is an explanatory diagram.

In a converter of the type represented by converter 300 characterized by high soot retention capacity for up to 10 or more hours of operation before regeneration is needed, the regeneration allowable operating zone is bounded on one end by a threshhold of incomplete regeneration and on the other end by a threshhold of blow-off. This zone is substantially wide enough to accommodate the variance in predicting trap loading through use of the integration of engine RPM and rack position with respect to time and comparison thereof with engine soot mapping data. FIG. 17 is a diagram showing the regeneration allowable operating zone for both converter 300 and for a typical ceramic trap. The ceramic trap must be regenerated much more frequently and within a smaller allowable zone than converter 300.

FIG. 17 shows two curves a and b. Curve a is symmetric about the design loading, and represents the probability of the accumulated soot measurement being high. Curve b is skewed to the right, and represents the probability of the accumulated soot measurement being high while taking into account systems delays which may occur before actual regeneration starts.

Figure 15:
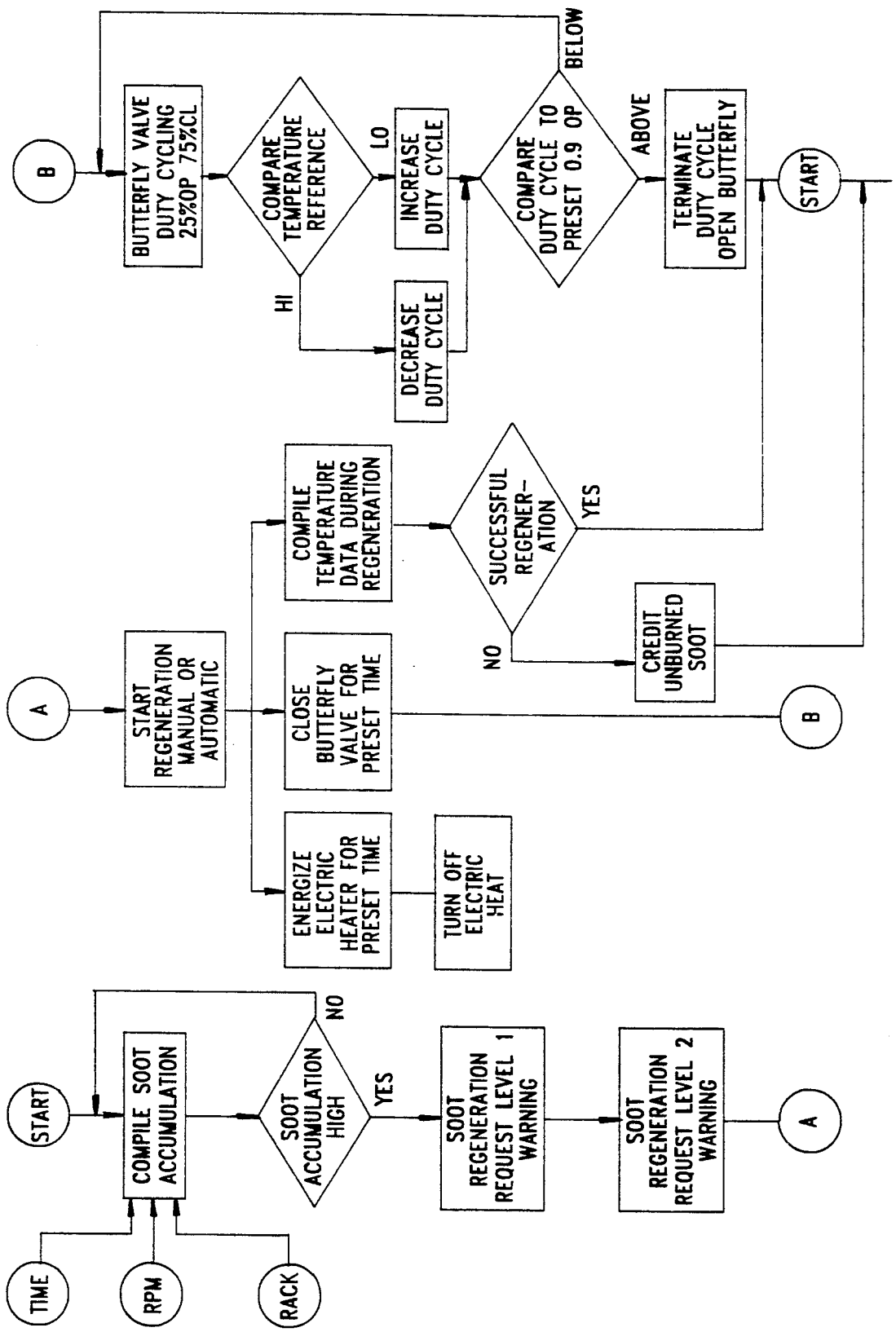
FIGS. 15 and 16 are block diagrams illustrating microprocessor logic diagrams that can be utilized in control of a diesel engine exhaust oxidizer.

FIG. 15 portrays a logic flow diagram for the operation of a microprocessor that is utilized for control of the regeneration process in converter 300 when the converter is used in a transit bus application. The first step in the process is to compile the level of soot accumulation in the particulate trap by integrating the rack position and RPM as a function of time in the manner previously described. So long as the soot accumulation does not reach a predetermined high level, this compilation continues. When the soot reaches a first predetermined high level, a level 1 warning starts. The probability of arriving at the beginning of a level 1 warning is represented by curve a in FIG. 17. This first warning level is a visual one that is provided by a warning light on the dash panel of the vehicle. If the converter is not regenerated within a certain amount of time, the second level of warning is initiated and this is preferably an audible sound that is given in conjunction with the first warning. The probability of starting regeneration during either a level 1 or a level 2 warning is represented by curve b in FIG. 17. Regeneration may be started either automatically or manually. As explained earlier, this depends upon the particular driving conditions. In the case of a transit bus, it is unlikely that city revenue service will be conducive to regeneration. Therefore regeneration will probably have to be manually initiated when the vehicle has returned to its yard and is idling.

Regeneration initially involves energizing the electric heating elements 326 for a preset time, closing butterfly valve 308 for a preset time, and thereafter duty-cycling the butterfly. The electric heater elements are turned off after a certain amount of energization. During regeneration, temperature data is compiled to determine whether a successful regeneration has occurred. The regeneration temperature is monitored with respect to time to provide an indication of the thermal heating units released during regeneration. If the monitored value equals or exceeds a reference value, regeneration is considered complete in which case the process of compiling soot accumulation in the new cycle can begin anew. That portion of the logic diagram between the block entitled "Close Butterfly Valve For Preset Time" and the block "Terminate Duty Cycle Open Butterfly" (String B of the diagram) involves the duty cycling of the butterfly valve in accordance with the technique described earlier for FIG. 1. It is during the execution of this portion of the cycle that the temperature data is being compiled.

As stated above, a successful regeneration cycle results in beginning to compile soot accumulation information from a starting level in which the initial soot accumulation is considered to be zero. In the event, however, that the compiled temperature data during regeneration indicated that a successful regeneration had not occurred, then it must be assumed that there is a certain amount of unburned soot left in the trap. In such a case, the compilation of soot from the new cycle is in effect, but it begins at a point at which it is assumed that a certain amount of soot exists in the trap due to the fact that not all the soot was burned off during the unsuccessfully completed regeneration. Because of this crediting of unburned soot into the soot accumulation, the next regeneration cycle will start earlier than it otherwise would if there were no credit for the unburned soot. This procedure ensures against encountering blow off in the new cycle.

In certain applications, such as transit bus application, the driving patterns are not conducive to the probability of a successful regeneration while the vehicle is being operated on the road. For this type of application the converter can be designed with a high retention capacity to operate for an extended period of time without regeneration. In this type of a situation, regeneration can be initiated manually by operating the transit bus at idle speed once it has returned to its service facility or service yard.

Figure 16:
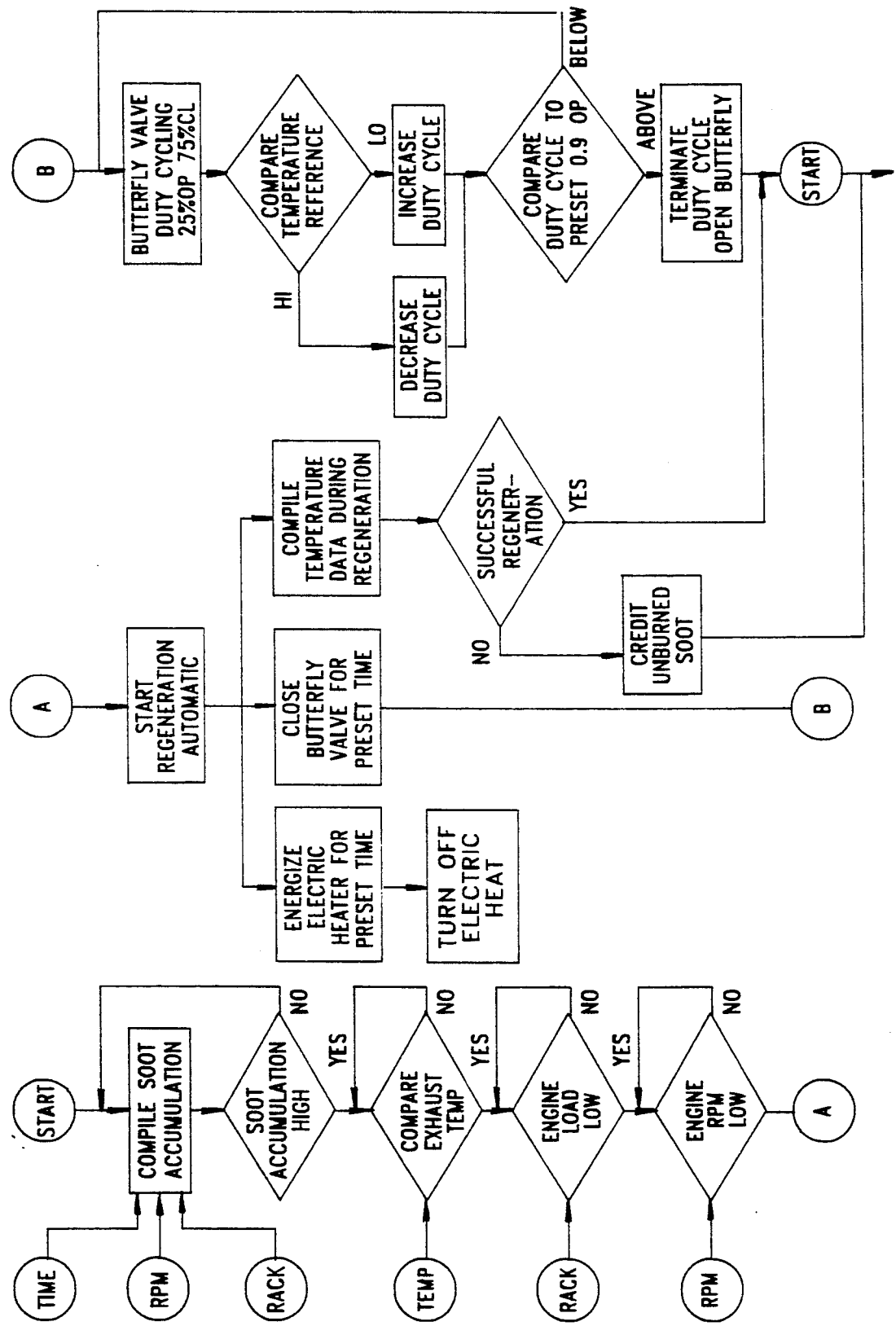

FIG. 16 illustrates a microprocessor logic diagram for a converter control that is used in truck and automotive type application as distinguished from transit bus type applications. The strings A and B of the logic diagram of FIG. 16 are identical to those of the strings A and B of the logic diagram of FIG. 15 except that in the logic diagram of FIG. 16, regeneration is started automatically. A further similarity in both logic diagrams is that the soot accumulation is compiled by integrating rack position and engine speed with respect to time. When the soot accumulation has reached a predetermined high level which is indicative of a need for regeneration (curve a in FIG. 17), the control then determines whether other conditions are conducive to initiating a regeneration. These conditions are the temperature of the exhaust, the engine load, and the engine speed. So long as the exhaust temperature is sufficiently high and the engine load and speed are not too excessive to ensure adequate oxygen content, then regeneration automatically takes place (curve b in FIG. 17). In other words, regeneration automatically occurs so long as the vehicle is being operated under proper driving conditions. Such proper driving conditions would be those conditions where the engine speed is not excessive and where the engine load is not excessive and where the exhaust temperature is sufficiently high to enhance combustion of the soot. It may happen that proper driving conditions are not reached within the nominal design range of the converter, but a delayed regeneration can still be within the regeneration allowable operating zone. In other words, the typical operation of an automobile or truck is such that there is an extremely high probability that conditions conducive to regeneration will occur within the regeneration allowable operating zone. In the unlikely event of having regeneration beyond the boundaries of the allowable operating zone, no adverse effects are encountered and the deviation will be corrected in the next regeneration cycle. The reason why the above disclosed technique of determining trap loading without transducers can be used is because the soot retaining capacity of the present converters is significantly high when compared to ceramic traps. Hence, although the prediction of trap loading by integrating engine speed and rack position with time may not be as accurate as when using pressure differential transducers, the error margin is well within the regeneration allowable operating zone.

As noted earlier, the converter is designed such that the pressure drop through the wire mesh when completely laden with soot is lower than the pressure drop required to force the flow through the bypass. Hence, when the butterfly is in the solid line position, there is no flow from inlet 302 into the bypass. To the contrary, with a clean trap and even up to the point where the trap becomes completely laden with soot, the flow through section 304 will actually result in a small recirculation through the bypass meaning a small reverse flow through the bypass in a direction opposite arrow 312. The amount of recirculation, of course, progressively decreases as the trap loading increases. With this organization and arrangement then, the bypass door 42 that was present in the version shown in FIG. 1 is unnecessary in converter 300.

I claim:

1. A diesel engine exhaust oxidizing device comprising an enclosure having an inlet for receiving diesel engine exhaust, a main flow path through said enclosure to an outlet of the enclosure, said main flow path containing a medium for trapping particulate material such as soot and removing significant amounts thereof from the exhaust flow through said main flow path, a by-pass through said enclosure for diverting flow from said main flow path, and a microprocessor control means for selectively controlling the flow through said main flow path and said by-pass in accordance with certain sensed conditions relating to the status of engine operation, in which the medium is annular in shape and including a series of nested annular vanes along the length of the interior of the annular medium for taking axial flow and directing it radially outwardly through the medium.

2. A diesel engine exhaust oxidizing device as set forth in claim 1 in which the medium comprises superimposed layers of wire mesh and wire felt rolled into an annular form.

3. A device as set forth in claim 1 including a converter in line with said device for oxidizing gaseous constituents of the exhaust.

4. A device as set forth in claim 1 including an electrostatic precipitator through which radial flow from the vanes is passed before reaching said medium.

5. A device as set forth in claim 4 in which said electrostatic precipitator comprises coaxial cylindrical screens which are separated by insulators which comprise air gaps forming stagnant spaces.

6. A diesel engine exhaust oxidizing device comprising an enclosure having an inlet for receiving diesel engine exhaust, a main flow path through said enclosure to an outlet of the enclosure, said main flow path containing a medium for trapping particulate material such as soot and removing significant amounts thereof from the exhaust flow through said main flow path, a by-pass through said enclosure for diverting flow from said main flow path, and a microprocessor control means for selectively controlling the flow through said main flow path and said by-pass in accordance with certain sensed conditions relating to the status of engine operation, said control means comprises a microprocessor for determining whether engine conditions are conducive to initiating regeneration of said trapping medium and a valve means for selectively opening and closing said main flow path and said by-pass to exhaust flow which enters the enclosure at said inlet, said enclosure comprises a double-walled cylinder, said main flow path being through an interior portion and the by-pass being through a surrounding portion surrounding said interior portion, means for regenerating the medium after a certain amount of particulate collection by the medium, means for opening said by-pass to flow during regeneration of the medium, and means to entrain the regeneration product with the flow through the by-pass prior to discharge of the flow through said outlet of said enclosure.

7. A diesel engine exhaust oxidizing device as set forth in claim 6 in which the medium comprises superimposed layers of wire mesh and wire felt rolled into an annular form.

8. A diesel engine exhaust oxidizing device as set forth in claim 7 including heating elements passing axially through said medium.

9. A diesel engine exhaust oxidizing device as set forth in claim 8 in which said heating elements are activated below a certain sensed temperature when said mechanism is open.

10. A diesel engine exhaust oxidizing device as set forth in claim 8 in which said heating elements comprise ceramic coated wire.

11. A diesel engine exhaust oxidizing device as set forth in claim 6 in which said microprocessor control means includes a thermocouple for sensing temperature of exhaust products and an ECU connected to the thermocouple for maintaining the regeneration temperature within a substantially constant range which combusts the trapped particulates and soot without damaging said medium.

12. A diesel engine exhaust oxidizing device as set forth in claim 6 including means for causing regeneration action to be taken by means for adding a certain heat input to the medium by an electric operated heater and then cycling the butterfly valve open and closed after the electric operated heater has been shut off.

13. A device as set forth in claim 6 wherein said trapping medium is annular in shape, and said flow path includes a means for directing the exhaust flow radially through the medium, and an annular shaped electrostatic precipitator through which the radial exhaust flow is caused to pass before reaching said medium.

14. A device as set forth in claim 13 in which said electrostatic precipitator comprises coaxial cylindrical screens which are separated by insulators which comprise air gaps forming stagnant spaces.

15. A device as set forth in claim 6 further comprising a thermal stabilizer disposed in said outlet for attenuating the peak temperature of gases discharged from the device by acting as a heat sink to the relatively hotter segments of gases and acting as a heat source to the relatively cooler segments of gases.

16. A device as set forth in claim 6 further comprising an electric heating element that is embedded in said trapping medium, said electric heating element comprising a ceramic coating and said medium comprising wire mesh strands that come in direct contact with the ceramic coated heating element, said wire mesh strands being selected to have a mean hydraulic diameter that will cause them to burn out in a relatively short period of time in the event of failure of the ceramic coating at any point where any of the wire mesh strands are in contact with the heating element whereby a short circuiting of the heating element due to degradation in the ceramic coating on the heating element that gives rise to short circuiting of the heating element through wire strands that are in contact with the heating element at the point of ceramic degradation will be self-correcting because the strands that are in contact with the heating element at the point of ceramic degradation will burn out thereby rendering the short circuit an open circuit.

17. A device as set forth in claim 14 further comprising an air injection means for injecting air into the enclosure and directing the air over the insulators to keep them clean and also improving combustion of the collected soot in said medium during regeneration of said medium.

* * * * *